(12) United States Patent
Radi

(10) Patent No.: US 6,594,327 B1
(45) Date of Patent: Jul. 15, 2003

(54) METHOD AND APPARATUS FOR INTERFACING TO E1 OR T1 NETWORKS

(75) Inventor: Mostafa Tony Radi, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/354,977

(22) Filed: Jul. 16, 1999

(51) Int. Cl.[7] ................................................. H04L 7/00
(52) U.S. Cl. ..................... 375/356; 375/220; 375/354
(58) Field of Search ................................ 375/354, 356, 375/365, 368, 220; 379/399.01; 370/503, 506, 509, 510, 514

(56) References Cited

U.S. PATENT DOCUMENTS 5,615,237 A * 3/1997 Chang et al. ............... 375/368
5,956,377 A * 9/1999 Lang .......................... 375/272
5,974,104 A * 10/1999 Dhara ......................... 375/368

OTHER PUBLICATIONS

Daniel Minoli, Enterprise Networking: Fractional T1 to SONET, Frame Relay to BISDN, pp. 95–110, Library of Congress Cataloging–in–Publication Data, 1993 Artech House, Inc.Norwood MA.

* cited by examiner

Primary Examiner—Stephen Chin
Assistant Examiner—Chieh M. Fan
(74) Attorney, Agent, or Firm—Blakely, Sokoloff, Taylor & Zafman LLP

(57) ABSTRACT

An apparatus including a frame buffer memory; a set of frame synchronizers coupled to the frame buffer memory; and, a set of receivers coupled to the buffer memory and a corresponding frame synchronizer in the set of frame synchronizers. Each receiver is configured to receive a data stream having a first clock rate, and detect changes in the data stream using a second clock rate.

36 Claims, 6 Drawing Sheets

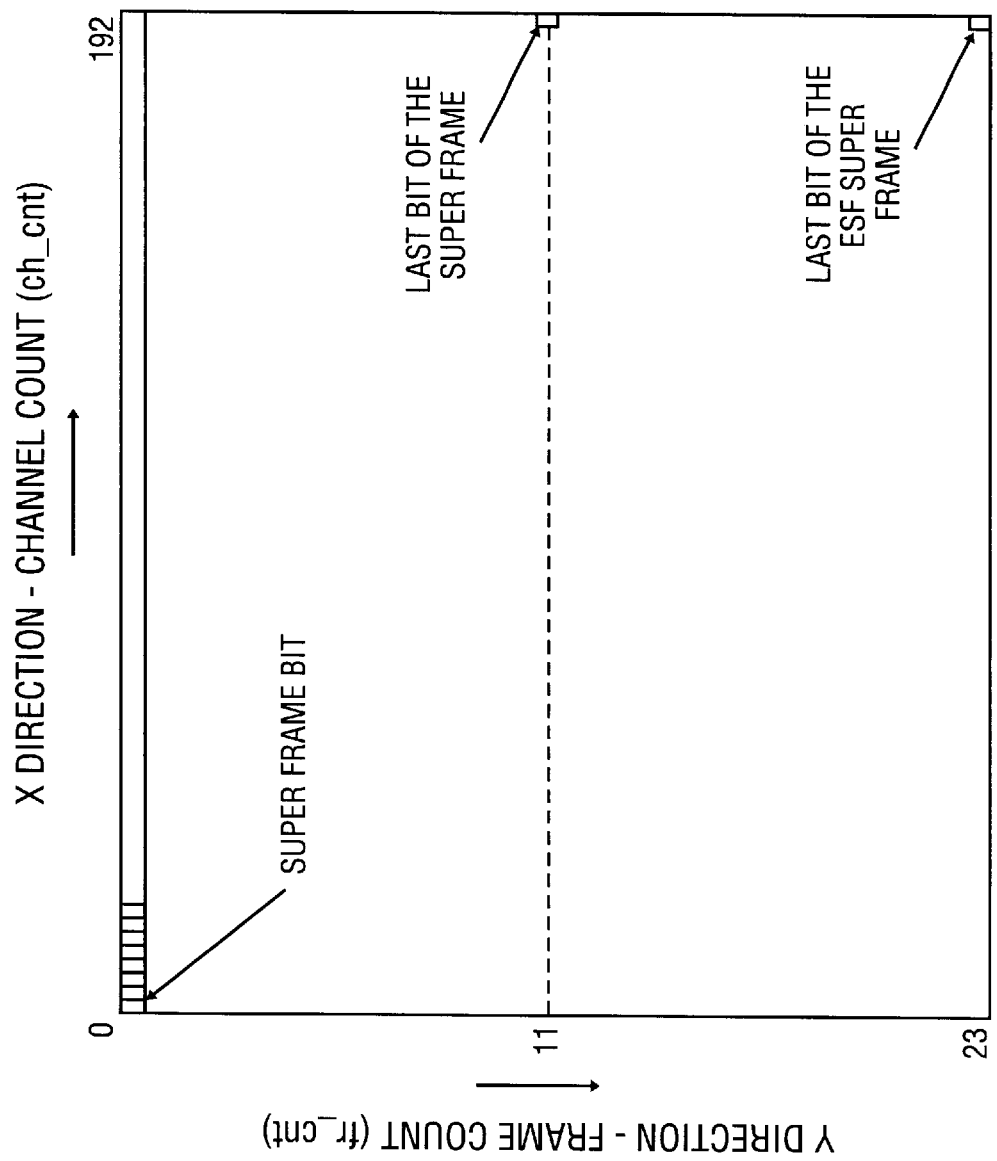

METHOD AND APPARATUS FOR INTERFACING TO E1 OR T1 NETWORKS

FIELD OF THE INVENTION

This invention relates to network interface communication. Specifically, this invention is directed towards a method and apparatus for interfacing to E1 or T1 networks.

BACKGROUND

Currently, there are many specifications for the transmission of serial data streams. However, there are two predominant standards that are in use. The first, used in such areas as North America, is DS1. The second, known as E1, is used mainly in European countries.

DS1, also known as T1, is a broadband standard for transmission of a serial data stream at 1.544 megabits per second (Mb/s). DS1, at the logical link layer, requires a specific method of framing the payload data. The framing is required for the demarcation of each frame to allow the extraction of the channelized traffic, payload, cyclic redundancy checking, and management information on the receiving end for appropriate processing. The framing structures are specified by the American National Standards Institute (ANSI) T1.403-1995, titled "Telecommunications—Network-to-Customer Installation—DS1 Metallic Interface"; International Telecommunication Union (ITU) G.704, titled "Synchronous frame structure used at 1544, 6312, 2048, 8448 and 44 736 kbit/s hierarchical levels"; and, ITU G.706, titled "Frame alignment and cyclic redundancy check (CRC) procedures relating to basic frame structures defined in Recommendation G.704".

The framing structure for T1 requires that 1 overhead bit be inserted after every 192 bits of payload, such that one frame consists of 193 bits. The overhead bit identifies the frame boundary and may also be used for management functions. Thus, the overhead bit may be a framing bit, a cyclic redundancy check bit, or a link management bit. The overhead bit is inserted into the transmitted stream at the transmit side. On the receive side, the incoming bit stream is examined to find the overhead bit (e.g., framing boundary). Once the location of the framing boundary is found, payload and control information may be extracted. The process of finding the framing bit location in the absence of any errors should complete within 50 milliseconds.

A DS1 frame synchronizer located at the receive side is responsible for locating the overhead bit (e.g., the framing boundary) in an incoming data stream. Once the frame synchronizer has located the overhead bit, the payload and overhead portions may be extracted from the stream of data. In DS1, the data rate is specified to be at 1.544 Mb/sec. As minor deviations in the data rate are acceptable, the detected clocking of the incoming data is extracted at the receive side by the physical layer transceivers of the network device and sent to the DS1 frame synchronizer along with the data.

Another currently widely deployed standard is the E1, which is a European broadband standard for transmission of a serial data stream at 2.048 Mb/s. The E1 logical and physical layer requirements are also specified by the standards set forth in ITU G.704 and ITU G.706. Similar to DS1, the clocking of the incoming data is extracted at the receive side by the physical layer transceivers and sent to the E1 frame synchronizer along with the data. The E1 frame synchronizer has functions similar to the DS1 frame synchronizer, which is to analyze the stream of data presented by the physical layer and extract the payload and overhead data. However, the E1 standard provides that, instead of inserting 1 overhead bit after 192 payload bits in a frame as specified in DS1, 8 overhead bits are inserted at the beginning of every frame.

Currently, E1 and DS1 frame synchronizers are produced as application specific integrated circuits (ASICs). In addition, these ASICs are produced as different parts primarily due to the differences between the two standards. Thus, two different devices must currently be produced, one for each type of system. For each type of device, a different clocking signal must be used. Having to provide different devices that support different systems adds cost and complexity to the infrastructure of a company, in addition to added inventory and support costs.

SUMMARY

It is therefore an intended advantage of one of the described embodiments to provide an ASIC that may be configured to function as an E1 or T1 frame synchronizer.

It is a further intended advantage of the present invention to provide a single clocking interface for the ASIC, such that only one clock signal needs to be provided to the ASIC.

These and other intended advantages of the described embodiments are provided by an improved de-framer that may operate with data streams generated by various input clocks. The de-framer includes a frame buffer memory; a set of frame synchronizers coupled to the frame buffer memory; and, a set of receivers coupled to the buffer memory and a corresponding frame synchronizer in the set of frame synchronizers. Each receiver is configured to receive a data stream at a first clock rate, and detect changes in the data stream at a second clock rate.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which:

FIG. 3 is a block diagram of the configuration of a frame buffer memory contained in the incoming data processing unit of FIG. 2.

DETAILED DESCRIPTION

The DS1 synchronizer, or frame synchronizer, of the present system finds the framing bit location within an incoming DS1 framed bit stream. In one embodiment, there are 28 incoming DS1 framed serial bit streams. The incoming bit streams are stored in a frame buffer memory and a state machine in the frame synchronizer analyzes them for the framing location. In one embodiment, the frame synchronizer searches all the incoming bit streams simultaneously and synchronization is acquired for all bit streams within a 50 milliseconds time frame.

Figure 1:
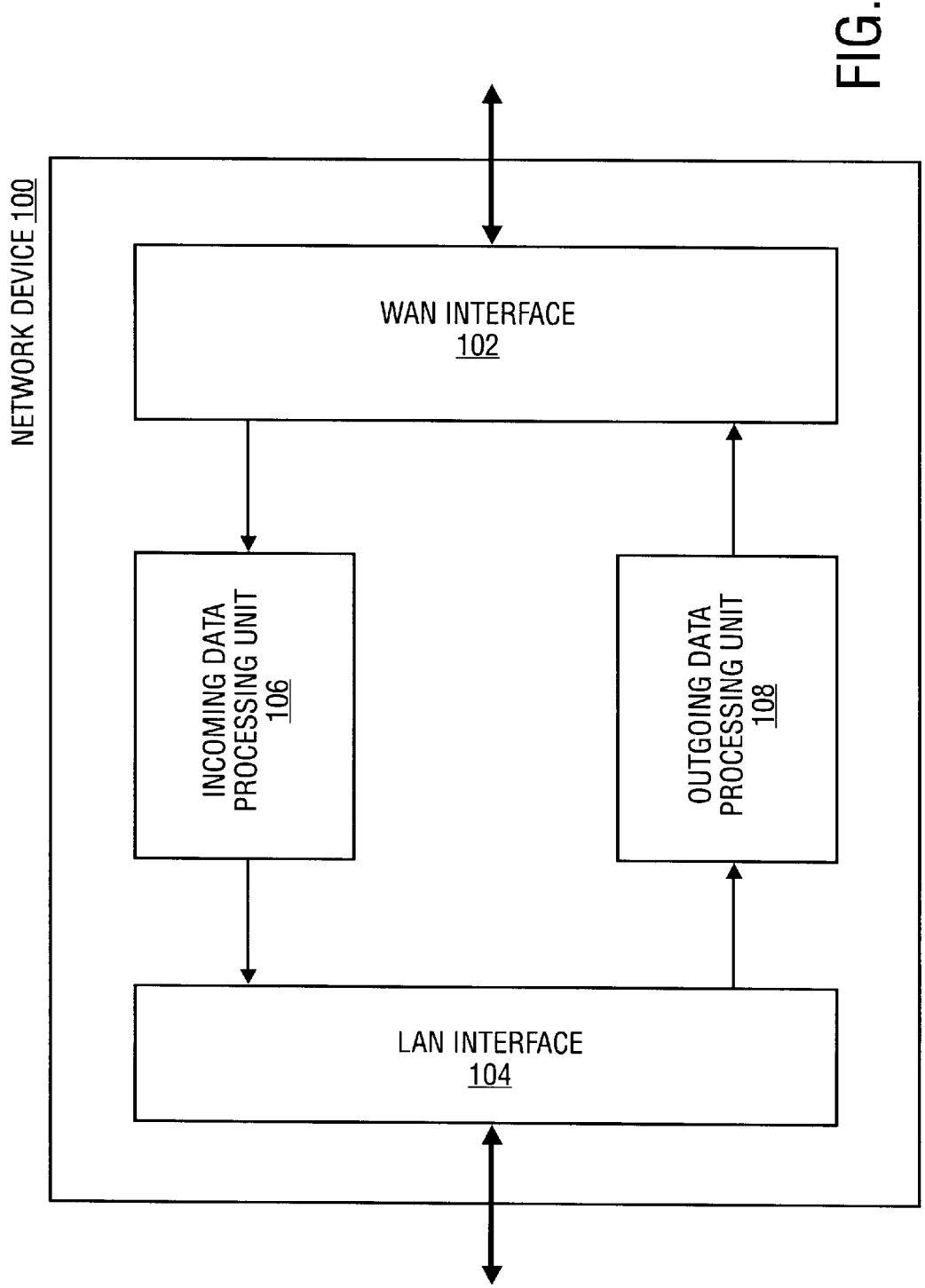
FIG. 1 is a block diagram of a network device configured in accordance with one embodiment of the present invention.

FIG. 1 illustrates a network device 100, including a wide area network (WAN) interface 102, a local area network (LAN) interface 104, an incoming data processing unit 106, and an outgoing data processing unit 108.

WAN interface 102 provides DS1 or E1 data to incoming data processing unit 106 and receives DS1 or E1 data from outgoing data processing unit 108. WAN interface 102 functions to transmit data received from outgoing data processing unit 108 to a WAN. In addition, WAN interface 102 also receives data from the WAN to be sent to incoming data processing unit 106. In one embodiment, WAN interface 102 provides the data received from outgoing data processing unit 108 and sent to incoming data processing unit 106, respectively, in the DS1 or E1 format. In one embodiment, the WAN is a synchronous optical network (SONET).

LAN interface 104 provides an interface to a LAN for incoming data processing unit 106 and outgoing data processing unit 108. For example, LAN interface 104 is responsible for packetizing the data that it receives from incoming data processing unit 106 to be sent out on a LAN. In addition LAN interface 104 is responsible for de-packetizing data that it sends to outgoing data processing unit 108. In one embodiment, LAN interface 104 is configured to interface incoming data processing unit 106 and outgoing data processing unit 108 to a network configured in accordance with the Institute of Electrical and Electronics Engineers 802.3 ("Ethernet") standard.

Incoming data processing unit 106 receives the incoming DS1/E1 data stream from WAN interface 102, transforms the data into a format suitable for LAN interface 104, and passes that data to LAN interface 104. Incoming data processing unit 106 also matches the frame pattern (e.g., locates the framing bit in each frame) and determines when it has lost the frame synchronization ("sync"). If the frame sync is lost, then incoming data processing unit 106 regains frame sync to output valid data again.

Outgoing data processing unit 108 is responsible for taking the data that is received from LAN interface 104 and framing it in DS1 or E1 format to send to WAN interface 102. Outgoing data processing unit 108 may optionally insert CRC data and other data as desired by the configuration of the parameters for the unit.

Figure 2:
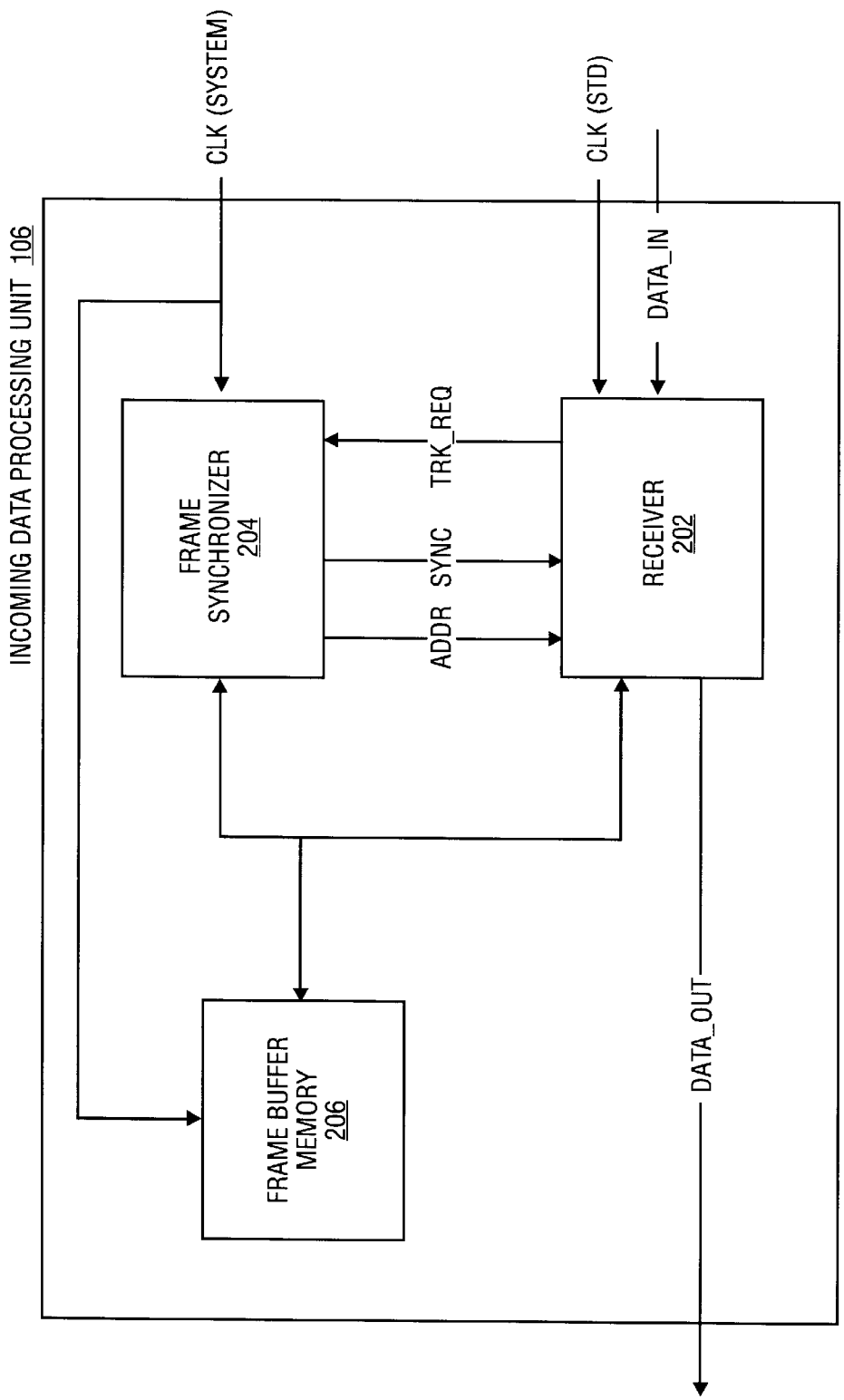
FIG. 2 is a block diagram of an incoming data processing unit of the network device of FIG. 1 configured in accordance with one embodiment of the present invention.

FIG. 2 is a block diagram of incoming data processing unit 106 of network device 100 containing a receiver 202, a frame synchronizer 204, and a frame buffer memory 206. In FIG. 2, only a single frame synchronizer and receiver is shown. However, multiple frame synchronizers and receivers may exist to handle multiple data streams.

In one embodiment, incoming data processing unit 106 is programmed through its register interface. The registers can be written onto or read from by the embedded CPU or by an external master through a standard interface bus.

Receiver 202 receives the data from WAN interface 102 and formats it for transmission to LAN interface 104 once the frame boundaries have been determined. Receiver 202 also contains the cyclical redundancy check (CRC) generator and checker units (not shown) to ensure correct receipt of data. For example, receiver 202 generates the CRC for the extended super frame (ESF) framing mode, latches it for comparison with the incoming frame CRC bits, and generates error indicators.

Frame synchronizer 204 is responsible for determining the frame boundaries on the incoming data stream of DS1 or E1 data that is received by receiver 202. In one embodiment, frame synchronizer 204 contains a state machine for determining sync on the incoming data stream. The state machine determines the framing bit location by collecting bits at 193 bit positions corresponding to an identified candidate framing bit and determining if the collected bits match a specific framing pattern. The state machine may be programmed to find a match in the candidate framing bit one or more times before the candidate framing pattern is declared as a positive framing bit location match. If the candidate framing bit is not determined to be "valid", then the state machine moves to the next location and begins the process over again.

Frame buffer memory 206 contains the data for the incoming data streams that is translated by receiver 202. Before the frame boundaries in the incoming serial data stream from WAN interface 102 have been identified, receiver 202 writes the data stream to frame buffer memory 206. This write is a continuous operation. Once the frame sync is acquired, frame buffer memory 206 is no longer used to store incoming data. Thus, frame buffer memory 206 is used only prior to frame sync acquisition.

In one embodiment, the receiver and frame synchronizer structure is duplicated on a per link basis. Each receiver processes a separate data stream from WAN interface 102 while an associated frame synchronizer independently traces that data stream. Thus, all streams may have different clocking and frame reference points.

Where there are multiple receivers and frame synchronizers operating in incoming data processing unit 106, frame buffer memory 206 is shared by all state machines and is configured to operate at a much faster rate than any individual frame synchronizer. As long as frame buffer memory 206 is configured to operate at a sufficient rate, there is no limit as to how many frame synchronizers that frame buffer memory 206 may support. By having all bit streams share the same frame buffer memory, the need for separate memories is eliminated for each link and the size of the ASIC is substantially reduced. In addition, this memory can be placed on a corner and so as to not cause blockage for routing of others signals. This saves silicon and allows higher space efficiencies by reducing blockage of other signals, which would occur if multiple smaller memories were to be placed in the ASIC. Typically, any memory, small or large, in an ASIC requires a fixed area for power routing and other process related logic. Having a large number of memory structures blocks routing of other signals and occupies additional space. For example, 28 small memories require an area many times larger than a single large shared memory. Where a single memory is used, a controller in frame buffer memory 206 (not shown) arbitrates the access to the memory by the 28 channels. Frame buffer memory 206 access is clocked at a sufficient speed to allow for simultaneous accesses by all devices. For frame buffer memory 206 to support a larger number of bit streams (or, DS1/T1 channels), frame buffer memory 206 may be increased in size. In addition, frame buffer memory 206 may read out 16-bits (or more) at one time, instead of reading out only 8-bits, as in the embodiment described herein.

Frame synchronizer 204 analyzes multiple locations with each read from frame memory 206. In one embodiment, frame synchronizer 204 analyzes 8 locations (e.g., 8 bits) at a time. If frame buffer memory 206 has a wider input/output, then frame synchronizer 204 may analyze more locations (e.g., a 16-bit wide memory yields 16-bits of data that may be looked at simultaneously by frame synchronizer 204). Once a candidate for framing location is found within the analyzed locations, it is proven in the subsequent frames. For example, if bit 3 of the 8-bit memory data becomes the framing bit candidate, the successive 193 bits from that location is examined to determine if it contains the correct framing sequence. On subsequent reads at the candidate location from the memory during the following frames, all bits previous in position to the candidate are masked. This is to ignore false matches (also referred to as "mimics"), that show up later in other bits within the same 8-bit read as frame buffer memory 206 only provides a resolution of 8-bits. Thus, once a bit location is examined and rejected as a framing bit, later errors or mimic patterns are rejected at that bit position until all other bits are examined. This speeds up the lookup process in the presence of bursty errors.

If at any time while the programmed number of matches within the current framing bit candidate in the subsequent frames is not reached, and the framing pattern does not match the expected pattern, the candidate is discarded and the search continues by frame synchronizer 204.

Frame synchronizer 204 also rejects persistent mimic patterns in ESF framing method via CRC checking, speeding the lookup process in the presence of such errors. The synchronizer interface to frame synchronizer 204 is as follows. Receiver 202 requests a search for the framing pattern using a tracking request (TRK_REQ) signal line and frame synchronizer 204 returns the framing bit coordinates plus a validation signal using a set of address (ADDR) signal lines and a synchronization indicator (SYNC) signal line, respectively.

Making operation of the system in DS1 or E1 environments transparent to the board designer happens through oversampling of the incoming data from the WAN interface 102. The input data is latched along with its incoming associated input clock (e.g., 1.544 Mhz for DS1). When the next incoming clock is edge-detected (via oversampling), the previously latched data is fed into the fast clock domain of the incoming data processing unit 106. Oversampling allows the incoming clock to be at any rate—even gapped (irregular) clocks are acceptable. Using edge-detection on the incoming bit stream allows the interfacing of incoming data processing unit 106 to any clock, yielding one clock "footprint" and reducing surrounding clocking circuitry. This simplifies board design and interface requirements.

Allowing gapped clocking means that incoming data processor unit 106 imposes no limitation on the interface clock rate and no consideration must be made for jitter. As only packet buffers (contained in LAN interface 104 and not shown) are downstream from the incoming data processing unit 106, the gapped clocking feature does not cause slipping or other undesired phenomena. If the received data were supplied to telecommunications devices as opposed to packet buffers, then gapped clocking would cause slippage. The advantage of having packet buffers receiving the data is that they are hypothetically infinitely large. Therefore, a regular rate is not required for the incoming data.

Combining E1 and DS1 on the same part allows having the same board designed for both Europe and North America. The software that is loaded in the device determines how the part is configured. Having the same board substantially reduces the testing and qualification, manufacturing, and time-to-market for different version of the product.

FIG. 3 illustrates one configuration of frame buffer memory 206 designed to support one single link. As shown, frame memory 206 contains 24 rows (0–23), or frames, each with 193 columns (0–192), or channels. Frame memory 206 may support either the 12 frame "superframe" format or the 24 frame "extended superframe" format. This structure may be duplicated for each additional channel that frame buffer memory 206 has to support. If the frames are properly aligned, where position (0,0) contains the first bit of either the SF or ESF, then the last bit of the SF falls on the last position (column 192) of frame 12 (row 11). Similarly, the last bit of the ESF would fall on the last position (column 192) of frame 24 (row 23). Table 1 shows the SF and ESF format in detail.

TABLE 1

SD1 SF and ESF Superframe Format

| Frame Number | Bit Number | Ft | Fs | SF Framing Bits | ESF Framing (Fe), DL, CRC6 bits |
|---|---|---|---|---|---|
| 1 | 0 | 1 | | 1 | DL |
| 2 | 193 | | 0 | 0 | C1 |
| 3 | 386 | 0 | | 0 | DL |
| 4 | 579 | | 0 | 0 | 0 |
| 5 | 772 | 1 | | 1 | DL |
| 6 | 965 | | 1 | 1 | C2 |
| 7 | 1158 | 0 | | 0 | DL |
| 8 | 1351 | | 1 | 1 | 0 |
| 9 | 1544 | 1 | | 1 | DL |
| 10 | 1737 | | 1 | 1 | C3 |
| 11 | 1930 | 0 | | 0 | DL |
| 12 | 2123 | | 0 | 0 | 1 |
| 13 | 2316 | Repeat Every 12 frames | | | DL |
| 14 | 2509 | ↓ | | | C4 |
| 15 | 2702 | | | | DL |
| 16 | 2895 | | | | 0 |
| 17 | 3088 | | | | DL |
| 18 | 3281 | | | | C5 |
| 19 | 3474 | | | | DL |
| 20 | 3667 | | | | 1 |
| 21 | 3860 | | | | DL |
| 22 | 4053 | | | | C6 |
| 23 | 4246 | | | | DL |
| 24 | 4439 | | | | 1 | where: Ft stands for "terminal framing bits", the notion comes from channel banks trying to sync up to the incoming 24 frame patterns. Fs stands for "signal framing bits" or multi-frame alignment bits, the notion comes from needing to know the superframe location in SF mode to look at specific DS0 channels to find the so called signaling information. Fe stands for framing bit in ESF mode". DL stands for "Data Link" bits, which are the bits that carry the management information.

Figure 4A:
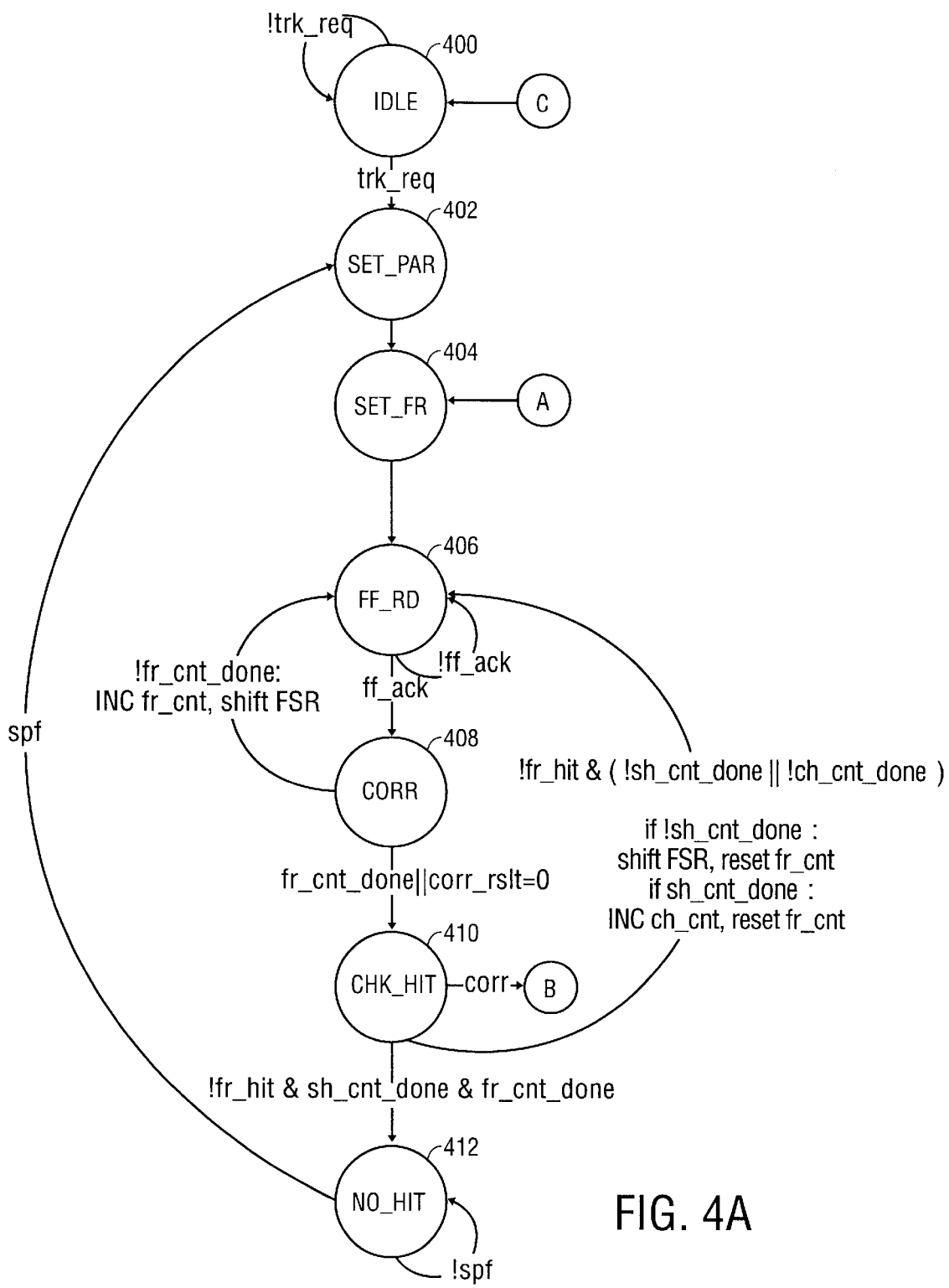
FIG. 4a and FIG. 4b are state diagrams of one method of operation of a frame synchronizer contained in the incoming data processing unit configured in accordance with one embodiment of the present invention.
Figure 4B:
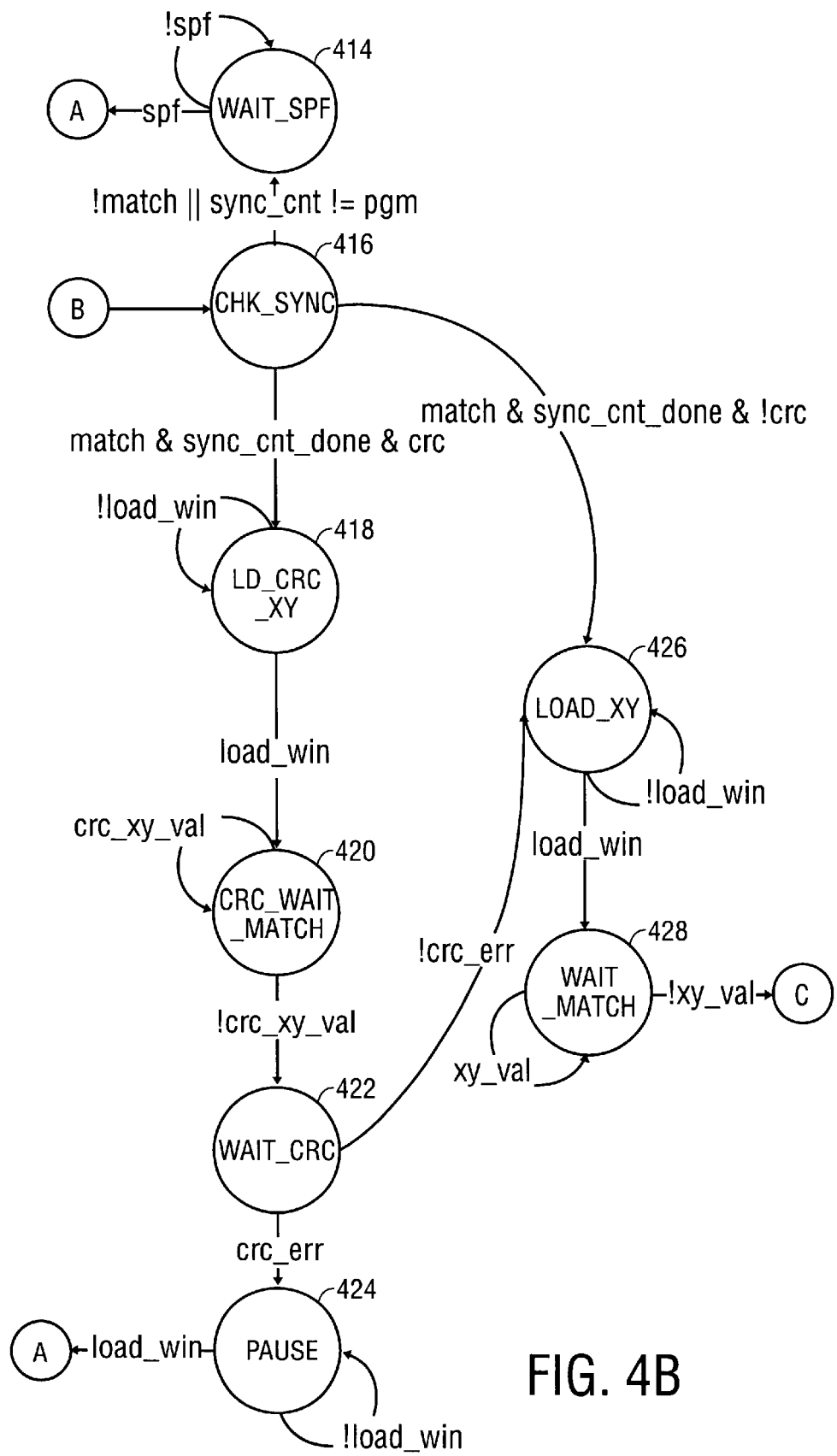

FIG. 4a and FIG. 4b is a state diagram of the state machine implemented in frame synchronizer 204 for locating the proper framing position in frame buffer memory 206 for a single DS1 formatted data stream. Generally, the search for (x, y) coordinates (also referred to as the channel and frame counts, respectively) of the super-frame bit starts at (x, y)=(0, 0) and proceeds in the (x) direction. For every (x) coordinate, all (y) coordinate possibilities are exhausted before advancing to the next (x) coordinate. Since the frame buffer memory is 8-bits wide, the x coordinates are searched 8-bits at a time. In addition, for each (x, y) coordinate that is searched, the current 8-bit pattern is rotated and compared. In the following description and as shown in FIG. 4a and FIG. 4b, the (x) coordinate is referenced as the channel count (ch_cnt) while the (y) coordinate is referenced as the frame count (fr_cnt). Also, the pattern to be matched is shifted, and the number of shifts (in the embodiment where there are 8 bits, the sh_cnt ranges from 0 to 7) are tracked by a shift count (sh_cnt).

The starting point in the state machine is state 400, where frame synchronizer 204 waits for a tracking request (trk_req) from receiver 202 before proceeding to state 402. Otherwise, if there is no tracking request (!trk_req), frame synchronizer remains idle.

In state 402, frame synchronizer 204 sets the parameters and counters necessary for finding the framing bit. In one embodiment, these include:

fr_cnt (frame count): the counter used in the search in the Y direction (FIG. 3). Thus, using the framing pattern and start applying at Y=0 and if no match then increment Y by 1 until Y=11 (SF) or Y=20 (ESF, see below subfr_cnt);

subfr_cnt (sub-frame cnt): used in the search in the Y direction in ESF mode, where, in ESF mode Y=0, then Y=4, then Y=8, etc. and subfr$_{13}$ cnt makes Y=1, 2, 3, and Y=5, 6, 7 and so on. Thus, fr_cnt is LINEAR from 0 to 11 in SF mode and is implemented with one counter, while in ESF mode the counter is broken into 2 pieces: a 2 bit counter (subfr_cnt) and a 3 bit counter (fr_cnt). The combination of both with subfr_cnt being the least significant digits cover 4 combinations and fr_cnt jumps in increments of 4. Another way of thinking of it is having one counter with 2 least significant digits called subfr_cnt and 3 most significant digits as fr_cnt (just a naming convention with same net effect of counting from Y=0 to Y=23) but cheaper implementation. fr_cnt from SF mode is reused in ESF with a 2-bit counter (subfr_cnt) augmenting it;

sh_cnt (shift count): is the count of the rotation of the fsr (frame shift register) value when fr-cnt search results in a no hit. sh_cnt is rotated (framing bits–1) times. 5 times for ESF (where ESF has 6 framing bits and a 6-bit fsr) and 11 times for SF (where SF has 12 framing bits and a 12-bit fsr); and, sync_cnt (sync count): is the number of times a match has been found for the current value of the (X,Y) holding register.

Thus, in state 402, fr_cnt, subfr_cnt, sync_cnt, and sh_cnt are set to zero; fsr value is set to its initial value (i.e. the appropriate framing value for the chosen SF or ESF mode); set the correlator value to all Ones (e.g. "11111111"). Also, in one embodiment, the (X,Y) coordinate should be set to (255,31). This needs to be done for this implementation and simplifies the logic to prevent a possible match existing for the above coordinate the very first time though the algorithm (note that the maximum possible coordinate is (192,23)). Thus, this prevents a need to generate a flag that indicates that it is the state machine's very first time though and (X,Y) should be invalidated. The very first time, the current (X,Y), i.e., (255,31), does not match any value found and a separate flag is not needed to track the initial walk-through of the state machine.

In addition, a pgm is set at this state. In one embodiment, a matching of 24 bits is desired. Thus, with ESF and CRC, 2 framing matches followed by 2 CRC at the (X,Y) coordinate suffices. For a SF, 4 framing matches are necessary if either Ft or Fs only matching modes are chosen; or 2 framing matches if Ft and Fs pattern are matched. Thus, the state machine can be synchronized to a specific pattern, and there is a choice of Ft only, Fs only, or both Ft or Fs. The state machine is given a fsr value to find and sync up to. The fsr value is comprised of Ft/Fs/Fe or a combination of them.

After frame synchronizer 204 is finished initializing the starting parameters, operation continues with state 404.

In state 404, frame synchronizer 204 sets fr_cnt to be 0. This is to ensure frame synchronizer 204 only increments the (x, y) coordinates in its search of frame buffer memory 206.

In state 406, frame synchronizer 204 reads from frame buffer memory 206 and waits for an acknowledgement (ff_ack) before proceeding to state 408. While there is no acknowledgement of a valid data read (!ff_ack), frame synchronizer 204 remains idle.

In state 408, frame synchronizer 204 performs the correlation and locates any possible frame hits (e.g., possible framing bit location matches). Frame synchronizer 204 then determines if the fr_cnt has reached the last (y) coordinate (row 11 for a SF and row 23 for an ESF) (fr_cnt_done) and if so, moves on to state 410. If the frame count is not done (!fr_cnt_done), frame synchronizer 204 increments the fr_cnt, and also shifts the FSR (e.g. increments sh_cnt) and returns to state 406.

In state 410, frame synchronizer 204 checks to see if there has been a hit during the correlation in state 408. There are three possible alternatives at this state:

1. If there is a correlation (corr), frame synchronizer 204 moves to state 416 in Frame 4*b*;
2. If there has not been a frame hit (!fr_hit) and neither the shift count nor the channel count are done (!sh_cnt_done || !ch_cnt_done) then frame synchronizer 204 returns to state 406 and either: (a) shifts FSR and resets fr_cnt if !sh_cnt_done; or (b) increments ch_cnt and resets fr_cnt if sh_cnt_done; or,
3. If there is !fr_hit but sh_cnt_done and fr_cnt_done, then frame synchronizer 204 moves to state 412.

In state 412, there has been no hit (!fr_hit) and the counts for the shift and frame are done (sh_cnt_done and fr_cnt_done, respectively), frame synchronizer 204 determines if a new SPF (spf) has been encountered. If so, the state changes to state 402. Otherwise, if a new SPF has not been encountered (!spf), then frame synchronizer 204 idles. SPF is an indication from the receive block (every 12 frames in SF or every 24 frames in ESF). This is used to start reading the memory again since once a candidate (X,Y) is found, the state machine has to verify it again and it should not verify the previous frames which just resulted in the current (X,Y). The state machine waits for the SPF indication and then it knows the data in the memory is refreshed. This is also true when there is no hit. The state machine should not reread what it just read until the SPF signal indicates that the memory data is refreshed. In the latter case memory controller bandwidth is wasted if there is no (X,Y) found by just repeating the read and search. If the state machine keeps reading in the latter case, no harm should be done if the memory was not shared with other state machines.

Where a correlation has been detected in state 410, frame synchronizer 204 moves to state 416, where frame synchronizer 204 verifies synchronization by examining the bit that is at 193 bits away from the current location to determine if that bit is a framing bit. If there is a match (match), the sync has been verified for the preset number of times as set in state 402 (sync_cnt_done), and CRC has not been enabled, then the state changes to state 426. If match, sync_cnt_done, and CRC has been enabled, then the state changes to 418. If there is no match (!match) detected in state 416 or synchronization has not been verified for the preset number of times (sync_cnt !=pgm), then the state changes to state 414.

In state 414, where !match and sync_cnt !=pgm, frame synchronizer 204 has to return to state 404 to attempt to re-synchronize. Before frame synchronizer 204 can return to state 404, however, frame synchronizer 204 must wait for the SPF (spf). Otherwise, frame synchronizer 204 idles when there is no SPF (!spf).

In block 418, where match, sync_cnt_done, and CRC has been enabled, frame synchronizer 204 attempts to provide the location (x, y) for the CRC value (crc_xy_val) to receiver 202 for receiver 202 to check the CRC match between the expected CRC value and the actual CRC value. Once the location information has been loaded (load_win) and is ready for receiver 202 to retrieve, frame synchronizer 204 moves to state 420. Otherwise, if the information has not been loaded (!load_win), frame synchronizer 204 idles.

In state 420, frame synchronizer 204 checks to see if crc_xy_val has been retrieved by receiver 202. This check is performed by seeing if the crc_xy_val value is still available (crc_xy_val). If crc_xy_val is still available, then receiver 202 has not retrieved the value and frame synchronizer 204 idles. If crc_xy_val is not available to frame synchronizer 204 (!crc_xy_val), then receiver 202 has retrieved the value and frame synchronizer 204 moves to state 422.

In state 422, frame synchronizer 204 waits for receiver 202 to generate a CRC and compare it to the CRC value passed by frame synchronizer 204. If there is a match and there is no CRC error (!crc_err), then frame synchronizer 204 moves to state 426. Otherwise, if there is a CRC error (crc_err), then frame synchronizer 204 moves to state 424. In one embodiment, frame synchronizer 204 waits for a predetermined time period for a CRC error before moving to state 426.

In state 424, frame synchronizer 204 has detected a crc_err, which means that the CRC value that was assumed to be accurate as the framing location was found is not correct. Thus, it is most likely that the framing bit is not the one that was previously identified. Frame synchronizer 204 thus idles until load_win.

In state 426, frame synchronizer 204 attempts to provide the (x, y) coordinates of the identified framing bit to receiver 202. Again, load_win is examined to determine when it is appropriate to place these two values on the register for transfer to receiver 202. If load_win, frame synchronizer 204 moves to state 428. Otherwise, if !load_win, frame synchronizer 204 idles.

In state 428, frame synchronizer 204 idles while the coordinates have not been retrieved by receiver 202, where these coordinates still exists in the registers (xy_val). Once the coordinates have been retrieved, the coordinates are no longer in the registers (!xy_val), and frame synchronizer 204 returns to state 400. Where frame synchronizer 204 waits for a new tracking request from receiver 202.

Figure 5:
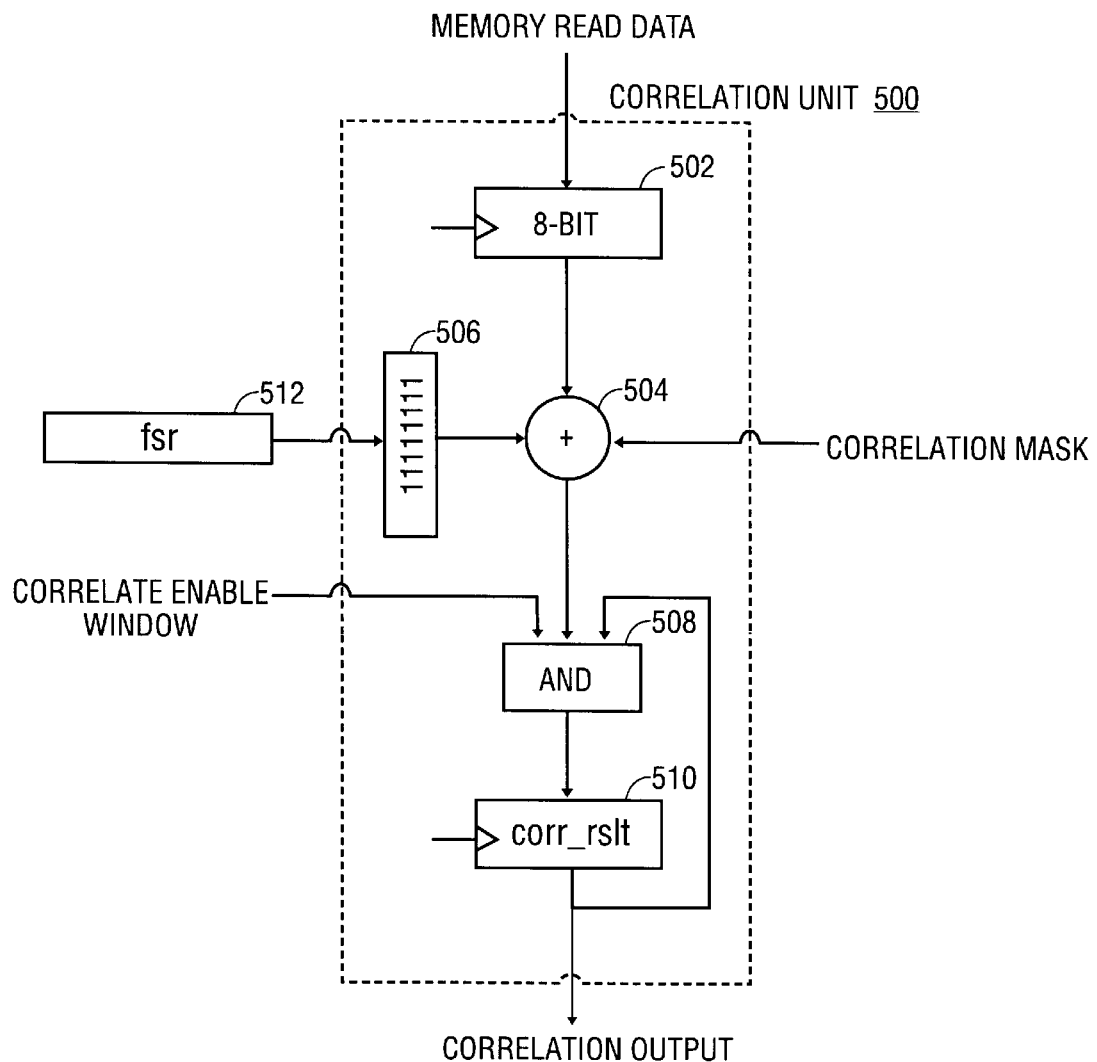
FIG. 5 is a block diagram of a correlation unit configured in accordance with one embodiment of the present invention.

FIG. 5 illustrates a logic block diagram of a correlation unit 500 that is contained in frame synchronizer 204. Correlation unit 500 includes an 8-bit register 502 for holding the value that is read from frame buffer memory 206; a register 506 for holding the expanded bits of the current bit of frame set register (FSR) 512; and a comparator 504 that compares the values in 8-bit register 502, register 506, and a correlation mask. Correlation unit 500 also includes an AND gate 508 to receive the value of comparator 504, a correlate enable window signal, and the output from a correlated result (corr_rslt) register 510.

In one embodiment, register 506 and comparator 504 implements a parallel 8-bit XOR operation. The state machine picks one bit from 512 and compares all 8-bits (read from the memory) simultaneously to this one bit.

Corr_rslt register 510 is a clocked circuit and the output of AND gate 508 is clocked into corr_rslt register 510 only during state 408 of FIG. 4a. This means no matter what the output of AND gate 508 is, only at the rising edge of clock in state 408 of FIG. 4a, does corr_rslt register 510 get its new value. The reason that Correlate Enable Window is obtained is that in some cases (e.g., bit 12 of SF mode), even in state 408 of FIG. 4a, corr_rslt register 510 should not be updated. Since corr_rslt register 510 is always updated in state 408 of FIG. 4a, the trick is on those cases just feedback 510 output to itself. Thus:

1. corr_rslt register 510 opens up for new data only on rising edge clock in state 408 of FIG. 4a;
2. When corr_rslt register 510 opens, the future value of corr_rslt register 510 is the logical AND of the current output of corr_rslt register 510 and the value read from the frame memory 206;
3. For certain exception cases, #2 above is bypassed by the signal Correlate Enable Window which forces the future value of corr_rslt register 510 to be the current corr_rslt register 510 output value (thus preserving the output of corr_rslt register 510 to be present output). One exceptional case is the 12th bit of SF framing, which is not counted as a framing bit. This bit may be used for purposes other than framing bit (e.g. since SF mode has NO DL bits, some users have adopted this technique to use this bit as a way of passing DL).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A semiconductor chip, comprising:
   a) a set of frame synchronizers that read data from a frame buffer memory, said frame buffer memory for storing a super frame worth of data for each of a plurality of serial data streams, each super frame worth of data capable of being viewed as being organized according to a coordinate system having an x axis and a y axis, wherein the same channel position within different frames of said super frame have the same x axis coordinates but different y axis coordinates, each super frame worth of data also having a sequence of framing bits aligned along the y axis at the same x axis position, each of said frame synchronizers to gain frame synchronization with a different one of said serial data streams, each of said frame synchronizers configured to share said buffer memory in order to gain access to its corresponding super frame worth of data, each of said frame synchronizers designed to:
   1) correlate one or more columns of said corresponding super frame worth of data to a looked for version of said corresponding super frame data's sequence of framing bits by:
      a) reading from said frame buffer a group of one or more bits that run along a region of said x axis and are each positioned at a same y axis location and
      b) correlating each bit of said group of one or more bits to the bit of said looked for version of said sequence of framing bits that is positioned at said same y axis location and
      c) repeating a) and b) above for each y axis location of said corresponding super frame worth of data where one of said framing bits is located to see if said looked for version of said sequence of framing bits resides within said one or more columns;

2) repeat 1) above, if said looked for version of said sequence of framing bits does not reside within said one or more columns, for a next looked for version of said sequence of framing bits, said next looked for version of said sequence of framing bits created by rotating said looked for version of said sequence of framing bits;

3) repeat 2) above until a matching version of said sequence of framing bits is found within said corresponding super frame worth of data or until every possible version of said sequence of framing bits has been looked for within said corresponding super frame worth of data;

4) repeat 1), 2) and 3) above, if it is determined that said looked for version of said sequence of framing bits do not reside within said one or more columns, for a next group of one or more bits that run along a next region of said x axis so as to correlate a next one or more columns of said corresponding super frame worth of data to said first looked version;

5) repeat 4) above until said looked for version of said sequence of framing bits is found within said corresponding super frame worth of data or until every column of said super frame worth of data has been correlated to every possible version of said looked for said sequence of framing bits; and b) a set of receivers, each receiver being designed to:
1) receive a different one of said serial data streams and
2) write a super frame worth of data received from its corresponding serial data stream into said frame buffer memory.

2. The semiconductor chip of claim 1 wherein said super frame worth of data further comprises a super frame or an extended super frame worth of data.

3. The semiconductor chip of claim 2 wherein said serial data streams further comprise T1 serial data streams or E1 serial data streams.

4. The semiconductor chip of claim 1 wherein each of said serial data streams can have a different clocking reference point.

5. The semiconductor chip of claim 1 wherein said frame buffer memory is integrated onto said semiconductor chip.

6. The semiconductor chip of claim 1 wherein said group of one or more bits is 8 bits.

7. The semiconductor chip of claim 1 wherein said group of one or more bits is 16 bits.

8. The semiconductor chip of claim 1 further comprising a pair of tracking request/synchronization indication signal lines between each synchronizer/receiver pair that operate on a same serial data stream, said tracking request signal line to propagate from a receiver a tracking request signal that indicates to its corresponding synchronizer that a framing reference for their common serial data stream is desired, said synchronization indication signal line to propagate from a synchronizer a synchronization indication signal that indicates to its corresponding receiver that synchronization to their common serial data stream has been obtained.

9. The semiconductor chip of claim 1 wherein latched bits of said serial data stream are fed into a higher clock speed domain of said semiconductor chip as edges of said serial data stream's associated input clock are being detected with oversampling.

10. The semiconductor chip of claim 1 wherein said serial data streams further comprise T1 serial data streams or E1 serial data streams.

11. A networking device, comprising:
1) a WAN interface; and
2) an incoming data processing unit that processes information received from said WAN interface, said incoming data processing unit further comprising
a) a set of frame synchronizers that read data from a frame buffer memory, said frame buffer memory for storing a super frame worth of data for each of a plurality of serial data streams, each super frame worth of data capable of being viewed as being organized according to a coordinate system having an x axis and a y axis, wherein the same channel position within different frames of said super frame have the same x axis coordinates but different y axis coordinates, each super frame worth of data also having a sequence of framing bits aligned along the y axis at the same x axis position, each of said frame synchronizers to gain frame synchronization with a different one of said serial data streams, each of said frame synchronizers configured to share said buffer memory in order to gain access to its corresponding super frame worth of data, each of said frame synchronizers designed to:
1) correlate one or more columns of said corresponding super frame worth of data to a looked for version of said corresponding super frame data's sequence of framing bits by:
a) reading from said frame buffer a group of one or more bits that run along a region of said x axis and are each positioned at a same y axis location and
b) correlating each bit of said group of one or more bits to the bit of said looked for version of said sequence of framing bits that is positioned at said same y axis location and
c) repeating a) and b) above for each y axis location of said corresponding super frame worth of data where one of said framing bits is located to see if said looked for version of said sequence of framing bits resides within said one or more columns;
2) repeat 1) above, if said looked for version of said sequence of framing bits does not reside within said one or more columns, for a next looked for version of said sequence of framing bits, said next looked for version of said sequence of framing bits created by rotating said looked for version of said sequence of framing bits;
3) repeat 2) above until a matching version of said sequence of framing bits is found within said corresponding super frame worth of data or until every possible version of said sequence of framing bits has been looked for within said corresponding super frame worth of data;
4) repeat 1), 2) and 3) above, if it is determined that said looked for version of said sequence of framing bits do not reside within said one or more columns, for a next group of one or more bits that run along a next region of said x axis so as to correlate a next one or more columns of said corresponding super frame worth of data to said first looked version;
5) repeat 4) above until said looked for version of said sequence of framing bits is found within said corresponding super frame worth of data or until every column of said super frame worth of data has been correlated to every possible version of said looked for said sequence of framing bits;

b) a set of receivers, each receiver being designed to:
1) receive a different one of said serial data streams and
2) write a super frame worth of data received from its corresponding serial data stream into said frame buffer memory.

12. The networking device of claim 11 wherein said super frame worth of data further comprises a super frame or an extended super frame worth of data.

13. The networking device of claim 12 wherein said serial data streams further comprise T1 serial data streams or E1 serial data streams.

14. The networking device of claim 13 wherein each of said serial data streams can have a different clocking reference point.

15. The networking device of claim 13 wherein said set of synchronizers, said set of receivers and said frame buffer memory are integrated onto the same semiconductor chip.

16. The networking device of claim 11 wherein said group of one or more bits is 8 bits.

17. The networking device of claim 11 wherein said group of one or more bits is 16 bits.

18. The networking device of claim 11 further comprising a pair of tracking request/synchronization indication signal lines between each synchronizer/receiver pair that operate on a same serial data stream, said tracking request signal line to propagate from a receiver a tracking request signal that indicates to its corresponding synchronizer that a framing reference for their common serial data stream is desired, said synchronization indication signal line to propagate from a synchronizer a synchronization indication signal that indicates to its corresponding receiver that synchronization to their common serial data stream has been obtained.

19. The networking device of claim 11 wherein latched bits of said serial data stream are fed into a higher clock speed domain of said incoming data processing unit as edges of said serial data stream's associated input clock are being detected with oversampling.

20. The networking device of claim 11 wherein said serial data streams further comprise T1 serial data streams or E1 serial data streams.

21. A method, comprising:
receiving a serial data stream;
writing a super frame worth of data received from said serial data stream into a frame buffer memory, said super frame worth of data capable of being viewed as being organized according to a coordinate system having an x axis and a y axis, wherein the same channel position within different frames of said super frame have the same x axis coordinates but different y axis coordinates, each super frame worth of data also having a sequence of framing bits aligned along the y axis at the same x axis position; and synchronizing to said serial data stream, said synchronizing further comprising:
1) correlating one or more columns of said super frame worth of data to a looked for version of said super frame data's sequence of framing bits by:
a) reading from said frame buffer a group of one or more bits that run along a region of said x axis and are each positioned at a same y axis location and
b) correlating each bit of said group of one or more bits to the bit of said looked for version of said sequence of framing bits that is positioned at said same y axis location and
c) repeating a) and b) above for each y axis location of said super frame worth of data where one of said framing bits is located to see if said looked for version of said sequence of framing bits resides within said one or more columns;
2) repeating 1) above, if said looked for version of said sequence of framing bits does not reside within said one or more columns, for a next looked for version of said sequence of framing bits, said next looked for version of said sequence of framing bits created by rotating said looked for version of said sequence of framing bits;
3) repeating 2) above until a matching version of said sequence of framing bits is found within said super frame worth of data or until every possible version of said sequence of framing bits has been looked for within said super frame worth of data;
4) repeating 1), 2) and 3) above, if it is determined that said looked for version of said sequence of framing bits do not reside within said one or more columns, for a next group of one or more bits that run along a next region of said x axis so as to correlate a next one or more columns of said super frame worth of data to said first looked version;
5) repeating 4) above until said looked for version of said sequence of framing bits is found within said super frame worth of data or until every column of said super frame worth of data has been correlated to every possible version of said looked for said sequence of framing bits.

22. The method of claim 21 further comprising
receiving a plurality of serial data streams;
storing a super frame worth of data received from each of said plurality of serial data streams; and
gaining synchronization to each of said serial data streams by performing said synchronizing with each of said stored super frames worth of data.

23. The method of claim 22 wherein said super frames worth of data further comprise super frames or extended super frames, or a combination thereof.

24. The method of claim 23 wherein said serial data streams further comprise T1 serial data streams or E1 serial data streams.

25. The method of claim 22 wherein each of said serial data streams have a different clocking reference point.

26. The method of claim 21 wherein said group of one or more bits is 8 bits.

27. The method of claim 21 wherein said group of one or more bits is 16 bits.

28. The method of claim 21 further comprising feeding latched bits of said serial data stream into a higher clock speed domain of a semiconductor chip as edges of said serial data stream's associated input clock are being detected with oversampling.

29. The method of claim 21 wherein said serial data stream further comprises a T1 serial data stream or an E1 serial data stream.

30. The method of claim 21 wherein said super frame worth of data further comprises a super frame or an extended super frame worth of data.

31. An apparatus, comprising:
a) a first means for storing a super frame worth of data for each of a plurality of serial data streams, each super frame worth of data capable of being viewed as being organized according to a coordinate system having an x axis and a y axis, wherein the same channel position within different frames of said super frame have the same x axis coordinates but different y axis coordinates, each super frame worth of data also having a sequence of framing bits aligned along the y axis at the same x axis position;

b) a set of second means for gaining frame synchronization with a different one of said serial data streams, each of said second means configured to share said first means in order to gain access to its corresponding super frame worth of data, each of said second means being a means for:
 1) correlating one or more columns of said corresponding super frame worth of data to a looked for version of said corresponding super frame data's sequence of framing bits by:
  a) reading from said first means a group of one or more bits that run along a region of said x axis and are each positioned at a same y axis location and
  b) correlating each bit of said group of one or more bits to the bit of said looked for version of said sequence of framing bits that is positioned at said same y axis location and
  c) repeating a) and b) above for each y axis location of said corresponding super frame worth of data where one of said framing bits is located to see if said looked for version of said sequence of framing bits resides within said one or more columns;
 2) repeating 1) above, if said looked for version of said sequence of framing bits does not reside within said one or more columns, for a next looked for version of said sequence of framing bits, said next looked for version of said sequence of framing bits created by rotating said looked for version of said sequence of framing bits;
 3) repeating 2) above until a matching version of said sequence of framing bits is found within said corresponding super frame worth of data or until every possible version of said sequence of framing bits has been looked for within said corresponding super frame worth of data;
 4) repeating 1), 2) and 3) above, if it is determined that said looked for version of said sequence of framing bits do not reside within said one or more columns, for a next group of one or more bits that run along a next region of said x axis so as to correlate a next one or more columns of said corresponding super frame worth of data to said first looked version;
 5) repeating 4) above until said looked for version of said sequence of framing bits is found within said corresponding super frame worth of data or until every column of said super frame worth of data has been correlated to every possible version of said looked for said sequence of framing bits;
c) a third means for:
 1) receiving a different one of said serial data streams and
 2) writing a super frame worth of data received from its corresponding serial data stream into said first means.

32. The apparatus of claim 31 wherein said super frame worth of data further comprises a super frame or an extended super frame worth of data.

33. The apparatus of claim 32 wherein said serial data streams further comprise T1 serial data streams or E1 serial data streams.

34. The apparatus of claim 31 wherein said group of one or more bits is 8 bits.

35. The apparatus of claims 31 wherein said group of one or more bits is 16 bits.

36. The apparatus of claim 31 wherein said serial data streams further comprise T1 serial data streams or E1 serial data streams.

* * * * *